United States Patent [19]

Yamakawa et al.

[11] Patent Number: 5,043,210

[45] Date of Patent: Aug. 27, 1991

[54] MAGNETIC RECORDING MEDIA HAVING TWO MAGNETIC LAYERS; THE FIRST FOR RECORDING A BASEBOARD SIGNAL AND THE SECOND FOR RECORDING A SUPERIMPOSED SURFACE AND SIGNAL

[75] Inventors: Yoshisuke Yamakawa, Niiza; Yoshihiro Honjo, Saku; Hiroshi Kawahara, Saku; Masashi Hayama, Saku, all of Japan

[73] Assignee: TDK Corporation, Tokyo, Japan

[21] Appl. No.: 553,602

[22] Filed: Jul. 18, 1990

[30] Foreign Application Priority Data

Jul. 18, 1989 [JP] Japan .................................. 1-185346

[51] Int. Cl.$^5$ .............................................. G11B 23/00
[52] U.S. Cl. ..................................... 428/323; 428/329; 428/336; 428/694; 428/900; 360/134
[58] Field of Search ............... 428/900, 694, 323, 329, 428/336

[56] References Cited

U.S. PATENT DOCUMENTS 4,409,281 10/1983 Kitamoto et al. .................... 428/212
4,506,000  3/1985 Kubota et al. ........................ 430/39
4,946,740  8/1990 Ono et al. ............................ 428/323

Primary Examiner—Merrell C. Cashion, Jr.
Assistant Examiner—Stevan A. Resan
Attorney, Agent, or Firm—Oblon, Spivak, McClelland, Maier & Neustadt

[57] ABSTRACT

A magnetic recording medium is used with a magnetic recording system in which a baseband recording signal is recorded on a magnetic recording medium and a surface-band recording signal with the effective recording depth being smaller than that of the baseband recording signal is then recorded thereon in superimposed relation. The non-magnetic substrate includes thereon a first magnetic layer and a second magnetic layer on that order, said second magnetic layer having a thickness substantially equal to the effective recording depth of said surface-band recording signal and a coercivity higher than that of said first magnetic layer.

8 Claims, 1 Drawing Sheet

MAGNETIC RECORDING MEDIA HAVING TWO MAGNETIC LAYERS; THE FIRST FOR RECORDING A BASEBOARD SIGNAL AND THE SECOND FOR RECORDING A SUPERIMPOSED SURFACE AND SIGNAL

BACKGROUND OF THE INVENTION

1. Field of the Invention

The present invention relates to a magnetic recording medium, esp., a magnetic recording medium used with VHS system VCRs of the type that baseband-records hi-fi sound carrier signals, and to a method for making it.

2. Prior Art

A video signal comprises a luminance signal part and a chrominance or color signal part. Applied to domestic VCRs of the VHS system, etc. is a direct recording system by the low-range conversion of the chrominance signal part.

Sound carrier signal recording in the VHS system is achieved either by linear sound recording in which the sound is recorded on an end of the tape with a fixed head or by hi-fi sound recording in which the sound is recorded on a track parallel to a video signal recording track with a rotary head.

Hi-fi sound carrier signal recording is of the so-called baseband recording system in which the hi-fi sound carrier signal is first recorded, and the video signal is then recorded thereon in superimposed relation. It is noted that the recording signal of hi-fi sound is an FM modulated signal that is longer in wavelength than the luminance signal part of the video signal, as can be understood from its carrier frequencies of 1.3 MHz and 1.7 MHz. Then, the effective recording depth of the hi-fi sound carrier signal is presumed to be about 1.5 to 3 times as deep as the effective recording depth of the video signal, i.e., the effective recording depth of the chrominance signal.

In such a baseband recording system, a recording of the hi-fi sound carrier signal is partly erased by a recording of the video signal.

Hence, the hi-fi sound carrier signal output is expressed in terms of a value found by the subtraction of an output erased by the recorded video signal from a carrier ouput in the case where the video signal is not recorded in superimposed relation.

As illustrated in FIG. 1, the carrier output (1.7 MHz output), measured when the video signal is not recorded in superimposed relation, decreases with increases in the coercivity of a magnetic layer. It is noted that FIG. 1 illustrates the results of measurement in an S-VHS system.

The rate of output erasion by the recorded video signal, on the other hand, decreases in proportion to the coercivity of a magnetic layer, as illustrated in FIG. 1.

With techniques for controlling the coercivity of a magnetic layer, therefore, it is impossible to increase the hi-fi sound carrier signal (hi-fi) output to a certain or more level, as illustrated in FIG. 1.

In addition, when it is intended to increase the hi-fi sound carrier signal output to a maximum by the choice of coercivity, the best results are not always obtained for the output and S/N ratio of the video signal.

Such problems are true of the VHS and S-VHS system alike. They also arise with not only the above combination of the sound carrier signal with the video signal but also recording on a baseband recording signal a signal with the effective recording depth being smaller than that of the former.

Another problem arising with the S-VHS system in particular is that the magnetic layer tends to decrease in mechanical strength because of being formed of very fine magnetic powders. This leads to a further problem that the durability, esp., still durability or life, of video tape drops.

Accomplished with such problems in mind, the present invention has for its object to provide a magnetic recording medium which is designed such that when a surface-band recording signal is recorded on a baseband recording signal in superimposed relation, successful results are obtained for the output and S/N of the surface-band recording signal and the output and C/N of the baseband recording signal are increasingly improved, and which has improved durability, and a method for making it. Another, or a particular, object of the present invention is to provide a magnetic recording medium used with the VHS system in particular, which enables the output and C/N ratio of a hi-fi sound signal to be noticeably improved, and a method for making it.

The above and other objects of the present invention are attainable by the following aspects of the invention.

According to the first aspect of the present invention, there is provided a magnetic recording medium used with a magnetic recording system in which a baseband recording signal is recorded on a magnetic recording medium and a surface-band recording signal with the effective recording depth being smaller than that of said baseband recording signal is then recorded thereon in superimposed relation, characterized in that:

a non-magnetic substrate includes thereon a first magnetic layer and a second magnetic layer on that order, said second magnetic layer having a thickness substantially equal to the effective recording depth of said surface-band recording signal, and said second magnetic layer having a coercivity higher than that of said first magnetic layer.

According to the second aspect of the present invention, there is provided a magnetic recording medium as set forth in the first aspect, wherein the total thickness of said first and second magnetic layers is larger than the effective recording depth of said baseband recording signal.

According to the third aspect of the present invention, there is provided a method for making a magnetic recording medium as set forth in the first or second aspect, characterized by:

coating a magnetic coating material for said first magnetic layer on said non-magnetic substrate, followed by smoothing and drying, and then, providing thereon another coating material for said second magnetic layer by coating.

The present invention is applied to magnetic recording systems in which a baseband recording signal is first recorded on a magnetic recording medium and a surface-band recording signal with the effective recording depth being smaller than that of said baseband recording signal is then recorded thereon in superimposed relation.

In the VHS system of the hi-fi sound baseband recording format that is a typical example of such recording systems as stated just above, the hi-fi sound carrier and video signals correspond to the baseband and surface-band recording signals, respectively.

The magnetic recording medium of the present invention comprises a substrate including thereon a first magnetic layer and a second magnetic layer on that order, said second magnetic layer having a thickness substantially equal to the effective recording depth of a video signal and a coercivity higher than that of said first magnetic layer.

Hence, it is only a part of the hi-fi sound carrier signal recorded on the second magnetic layer which is erased by the video signal recorded thereon in superimposed relation. Since the resulting rate of erasion is then very low because of the second magnetic layer having higher coercivity, the rate of reduction of the hi-fi sound carrier signal output due to superimposed recording is very low correspondingly.

In addition, partly because the first magnetic layer of lower coercivity is so highly sensitive to the hi-fi sound carrier signal and partly because the thickness of the second magnetic layer is substantially equal to the effective recording depth of the video signal, the proportion of the hi-fi sound carrier signal recorded on the first magnetic layer can be increased to a maximum.

For that reason, the present invention enables the hi-fi sound carrier signal output and C/N to be improved increasingly.

Furthermore, the luminance signal output and S/N are also greatly improved because of the second magnetic layer having higher coercivity.

Moreover, the magnetic recording medium of the present invention is improved in durability, since the magnetic layer arrangement of a double-layer structure is, as a whole, more improved in mechanical strength than a single-layer magnetic layer arrangement of similar thickness. The improvement in mechanical strength is further enhanced by providing the coating material for the second magnetic layer on the coating material for the first magnetic layer which has been dried and, preferably, cured, by means of coating.

Further features of the invention and advantages offered thereby are explained in greater detail with reference to preferred embodiments illustrated in the accompanying drawings.

DESCRIPTION OF THE ILLUSTRATED EMBODIMENTS

Figure 1:
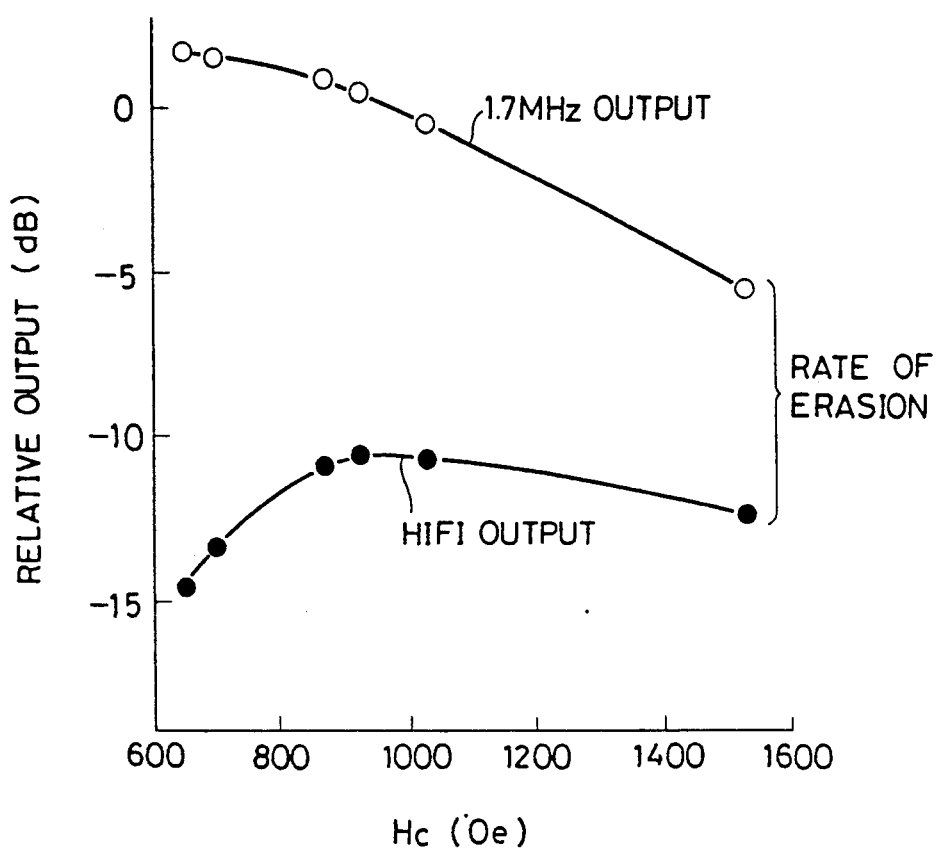
FIG. 1 is a graph showing the relation between the coercivity of a magnetic layer and the playback output of a hi-fi sound carrier signal.

In the description that follows, the illustrative embodiments of the present invention will be explained in greater detail.

The magnetic recording medium of the present invention is applied to magnetic recording systems in which a baseband recording signal is first recorded on a magnetic recording medium and a surface-band recording signal with the effective recording depth being smaller than that of said baseband recording signal is then recorded thereon in superimposed relation. The magnetic recording medium of the present invention used with such recording systems comprises a non-magnetic substrate including thereon a first magnetic layer and a second magnetic layer on that order, said second magnetic layer having a thickness substantially equal to the effective recording depth of the surface-base recording signal.

The present invention will now be explained with reference the VHS systems including VHS and S-VHS formats that are preferred examples of such recording systems.

In the VHS systems, the hi-fi sound carrier and video signals correspond to the baseband and surface-band recording signals, respectively.

Applied to the VHS systems is a direct recording format by the low-range conversion of chrominance signals, and the video signals comprise a luminance signal part and a chrominance signal part. Then, the chrominance signal zone lies in a region of frequency lower than does the luminance signal zone, and the effective recording depth of the video signal amounts to the effective recording depth of the chrominance signal.

In the present disclosure, the term "effective recording depth" refers to a depth that lies between 70%, preferably 50% and 15% incl. of the shortest recording wavelength in the case of saturation recording, by way of example. In such unsaturation recording as occurs with the chrominance signal, however, the effective recording depth is smaller than that attained in the case of the saturation recording of a recording signal of the same wavelength.

In consideration of the recording wavelength of the chrominance signal and a recording current in the VHS systems and as a result of experiments, it is found that satisfactory results are obtained when the effective recording depth of the chrominance signal in the VHS systems lies between 0.3 and 1.2 $\mu$m incl., preferably 0.4 and 1.0 $\mu$m incl., more preferably 0.4 and 0.8 $\mu$m incl.

When the thickness of the second magnetic layer exceeds the upper limit of the above-defined range, the proportion of the hi-fi sound carrier signal to be recorded on the first magnetic layer is so reduced that its output and C/N drop. If the thickness of the second magnetic layer is below the lower limit of the above-defined range, it is then substantially impossible to make superimposed recording of the video signal within the second magnetic layer alone. This gives rise to the erasion of the hi-fi sound carrier signal recorded on the first magnetic layer of lower coercivity and so drops of the hi-fi sound carrier signal output and C/N.

It is appreciated that for unsaturation recording signals other than the chrominance signal in the VHS systems, their effective recording depths may be determined experimentally. In the present invention, however, the second magnetic layer should preferably be 0.2 $\mu$m or above in thickness.

This is because at a thickness below 0.2 $\mu$m, abrasive particles, etc. contained in the magnetic layer, if it is of a coated type, would be exposed to view.

The thickness of the first magnetic layer is not critical. In order to increase the hi-fi sound carrier signal output, however, the total thickness of the 1st and 2nd magnetic layers should preferably be larger than the effective recording depth of the hi-fi sound carrier signal. It is appreciated that the hi-fi sound carrier signal has carrier frequencies of 1.3 MHz and 1.7 MHz and is experimentally found to have an effective recording depth of about 0.8 to 2.0 $\mu$m. However, the total thickness of the 1st and 2nd magnetic layers should lie between about 2.5 $\mu$m and about 4.0 $\mu$m incl., because it must usually correspond nearly to the effective recording depth of a linear sound carrier signal.

It is noted that the thickness of each magnetic layer may be found from a transmission type electron microphotograph (TEM photograph) of the section of the magnetic recording medium.

In the present invention, the second magnetic layer is higher in coercivity than the first magnetic layer.

Since the superimposed recording of the video signal occurs substantially on the second magnetic layer alone, the rate of erasion of the hi-fi sound carrier signal can be reduced by imparting higher coercivity to the second magnetic layer. The second magnetic layer of higher coercivity can successfully record a luminance signal of short wavelength.

On the other hand, the first magnetic layer of lower coercivity can successfully record the hi-fi sound carrier signal that is the baseband recording signal.

It is noted that the video and hi-fi sound carrier signals are unlikely to be reproduced at the same time, since they are recorded at different azimuth angles.

For the S-VHS format, it is desired that the first magnetic layer has a coercivity of 500 to 820 Oe, particularly 650 to 750 Oe, and the second magnetic layer has a coercivity of preferably 800 to 1200 Oe, more preferably 800 to 1100 Oe, most preferably 850 to 1000 Oe.

For the VHS format, on the other hand, it is preferred that the first magnetic layer has a coercivity of 500 to 720 Oe, particularly 600 to 700 Oe, and the second magnetic layer has a coercivity of 650 to 850 Oe, particularly 700 to 800 Oe.

With such coercivities as lying within the above-defined ranges, it is possible to increase the hi-fi sound carrier signal output and C/N to extremely high levels and improve the luminance signal output and S/N.

It is also understood that although not critical, other magnetic properties of the first magnetic layer may lie in such ranges as lending itself well to recording the hi-fi sound carrier signal. For both the S-VHS and VHS formats, it is preferred that the remanence is higher than 1500 G and the squareness ratio is higher than 0.83.

It is also understood that although other magnetic properties of the second magnetic layer are not critical, the remanence and squareness should preferably lie within such ranges as mentioned below. This is because the higher the hi-fi sound carrier signal output before the superimposed recording of the video signal, the higher the resulting output after the superimposed recording of the video signal.

That is, for both the S-VHS and VHS formats the remanence and squareness ratio should be higher than 1300 G and 0.80, respectively.

No particular limitation is placed on the center-line average surface roughness—Ra—of the second magnetic layer. In order to give satisfactory recording of short wavelength, however, it should preferably be 0.01 $\mu$m or below. The lower limit then should preferably be about 0.002 $\mu$m, because no sufficient traveling performance can be achieved when the layer is made smooth excessively on its surface. More preferable for the S-VHS and VHS formats are 0.002–0.005 $\mu$m and 0.003–0.006 $\mu$m, respectively.

It is noted that Ra is provided for in JIS B 0601.

In order to achieve the second magnetic layer having such an Ra, it is preferred that the Ra of the non-magnetic substrate is 0.01 $\mu$m or below. The lower limit is then about 0.002 $\mu$m due to the need of ensuring improved traveling performance in the steps of producing substrates and tapes. More preferable for the S-VHS and VHS formats are 0.003 to 0.009 $\mu$m and 0.003–0.010 $\mu$m, respectively.

The Ra of the first magnetic layer should preferably 0.01 $\mu$m or below. By providing the second magnetic layer on the first magnetic layer having an Ra lying within such a range, it is easy to obtain the second magnetic layer having such an Ra as defined above. The lower limit should then preferably be 0.002 $\mu$m, because of the surface properties of the first magnetic layer being almost faithfully reflected in those of the second magnetic layer and for the same reason as set forth in connection with the lower limit of the Ra of the second magnetic layer. More preferable for the S-VHS and VHS formats are 0.002–0.005 $\mu$m and 0.003–0.006 $\mu$m, respectively.

It is understood that the aforesaid preferable ranges follow the NTSC standards. However, the preferable thickness of the second magnetic layer may similarly be found according to other standards inclusive of the PAL standards. Preferable ranges of other conditions may be found experimentally or in the manner provided for in the NTSC standards.

As long as the first and second magnetic layers have such properties as stated above, no particular limitation is imposed thereon. For them, various coated types of magnetic layers heretofore known in the art may be used.

For instance, use may be made of magnetic layers formed of magnetic particles and binders to which various additives such as electrically conductive fillers, abrasives, solid lubricants, liquid lubricants and surfactants may be added, if required.

As the magnetic particles, use may be made of any material which can be used for ordinary magnetic recording media. For instance, suitable particles such as iron oxide particles, e.g., $\gamma$-Fe$_2$O$_3$; Co-containing iron oxide particles, e.g., Co-containing $\gamma$-Fe$_2$O$_3$; magnetic metal particles; barium ferrite particles; and CrO$_2$ particles may be selected depending upon the purpose. Their coercivity and specific surface area (as measured by the BET method), for instance, may also be determined depending upon the purpose.

The coated type of magnetic layer arrangement may have a particle size suitable for the frequency to be recorded on each of its layer parts, i.e., the first and second magnetic layer parts. Preferable to this end is that magnetic powders of a smaller BET value are used for the first magnetic layer, whereas magnetic powders of a larger BET value are employed for the second magnetic layer.

No specific limitation is imposed upon the BET values of the magnetic powders used for each magnetic layer. For the VHS system, for instance, it is preferred that Co-containing iron oxide particles having a BET value of the order of 30 to 45 m$^2$/g and Co-containing iron oxide particles or magnetic metal powders having a BET value of the order of 40 to 55 m$^2$/g are used for the first and second magnetic layers, respectively.

As the binder, use may be made of any material which can be used for ordinary magnetic recording media. For instance, suitable binders such as reactive types of binders such as heat-curing and reactive resins; and radiation curing types of binders such as radiation curing resins may be selected depending upon the purpose.

Details of such coated types of magnetic layer arrangements are set forth in our co-pending applications, typically, Japanese Patent Kokai Application No. 62 (1987)-38522.

No particular limitation is imposed upon the non-magnetic substrate used for the magnetic recording medium of the present invention. A material chosen from various flexible materials and various rigid materials depending upon the purpose may be formed into a predetermined tape or other shape of predetermined size. For instance, polyesters such as polyethylene terephthalate may be used as the flexible materials.

It is understood that when the magnetic recording medium of the present invention is applied in the form of video tape, a back coat may optionally be provided on the other side of the non-magnetic substrate, i.e., the side in opposition to the side having the magnetic layers. The back coat is not critical, and may be any known coated type of back coat containing electrically conductive fillers and various pigments, or alternatively formed of a plasma-polymerized film.

Preferably, such a magnetic recording medium is produced by coating a coating material for the first magnetic layer on the non-magnetic substrate, followed by at least drying and smoothing, and providing another coating material for the second magnetic layer on the first magnetic layer by means of coating. Most preferably, the coating material for the second magnetic layer is provided on the first magnetic layer by coating after the coating material for the first magnetic layer has been cured.

With such an arrangement, it is easy to control the thickness of each magnetic layer, since it is most unlikely that when coating the magnetic coating material for the second magnetic layer, it may be mixed with the previously coated coating material for the first magnetic layer. This makes it possible to ensure the properties of each magnetic layer and is particularly effective for improving the output of the luminance signal recorded on the second magnetic layer.

The provision of the magnetic layers by such steps makes it possible to improve their mechanical strength as a whole.

The preferred degree of drying of the coating material for the first magnetic layer at the time of providing the coating material for the second magnetic layer by coating, for instance, may be expressed in terms of the percentage of residual solvents. This percentage is preferably 1% by weight or below.

The preferable degree of curing of the coating material for the first magnetic layer, for instance, may also be expressed in terms of gel fraction. Preferably, this fraction is upward of 70%. It is appreciated that the gel fraction refers to the weight ratio of the binder before and after the coated film is immersed in an organic solvent such as methyl ethyl ketone, by way of example. The immersion conditions, for example, are about 2 hours at 80° C.

After smoothing, the coating material for the first magnetic layer has preferably an Ra lying within such a range as defined above. This Ra is preserved even after curing.

No particular limitation is imposed upon how to coat the coating materials and how to make the resulting coats smooth. Suitable means so far known in the art may be selected. For curing, suitable means may again be selected depending upon the binders used.

It is appreciated that the present invention is effective for either the VHS systems or recording systems in which the surface-band recording signal is recorded on the baseband recording layer in superimposed relation.

Such superimposed recording systems include, in addition to the above-mentioned combination of video signals with hi-fi sound carrier signals, a combination of video signals with PCM sound carrier signals or tracking servo signals, and the like. In these cases, the present invention is applicable to not only video tapes but also video floppy disks for still video cameras.

In addition, when making superimposed recording of a signal having three or more frequency bands, use may be made of a magnetic recording medium including a magnetic layer arrangement of a multi-layered structure corresponding to the effective recording depth of each signal component.

EXAMPLES

The present invention will now be explained in greater detail, specifically but not exclusively, with reference to the following illustrative examples.

EXPERIMENTAL EXAMPLE 1

In order to make examination of the relationship between the coercivity of a magnetic layer and the output of a hi-fi sound carrier signal, tape samples including magnetic layers having different coercivities were prepared, thereby measuring the hi-fi sound carrier signal in the S-VHS format.

For measurement, the tape samples were prepared in the following manners.

The following compositions containing magnetic powders having different coercivities were put in a ball mill, in which they were dispersed for 24 hours to prepare various magnetic coating materials.

Composition I, mentioned below, was used to form a magnetic layer having a coercivity of 1200 Oe or below, while Composition II, again mentioned below, was used to form a magnetic layer having a coercivity exceeding 1200 Oe.

In the description that follows, the "parts" all mean parts by weight.

| Composition I | |
|---|---|
| Co-containing $\gamma$-$Fe_2O_3$ (having a BET value of 45 $m^2/g$) | 100 parts |
| Vinyl chloride/vinyl acetate/vinyl alcohol 92:2:6) copolymer (having a degree of polymerization of 400) | 10 parts |
| Polyurethane type resin (having a number-average molecular weight of 40,000) | 6 parts |
| Polyisocyanate | 3 parts |
| $\alpha$-$Al_2O_3$ (having a mean particle size of about 0.2 $\mu$m) | 8 parts |
| Lubricant | 2 parts |
| Methyl ethyl ketone | 200 parts |
| Cyclohexanone | 100 parts |
| Composition II | |
| Magnetic alloy powders (having a BET value of 50 $m^2/g$) | 100 parts |
| Vinyl chloride/vinyl acetate/vinyl alcohol (92:2:6) copoymer (having a degree of polymerization of 400) | 10 parts |
| Polyurethane type resin (having a number-average molecular weight of 40,000) | 6 parts |
| Polyisocyanate | 3 parts |
| $\alpha$-$Al_2O_3$ (having a mean particle size of about 0.2 $\mu$m) | 8 parts |
| Lubricant | 2 parts |
| Methyl ethyl ketone | 250 parts |
| Cyclohexanone | 100 parts |

With gravure techniques, the obtained magnetic coating materials were coated on a 14-μm thick polyester base film, followed by drying and surface smoothing. Afterwards, they were subjected to 24-hour curing reactions at 60° C.

Then, the film was cut to a width of 12.65 mm to obtain magnetic tape samples.

The output of the hi-fi sound carrier signal was measured in the following manners.

It is noted that a BR-S711, made by JVC, modified such that external output could be inputted, was used for a measuring VTR, and HP3325A and HP3585A (both made by Yokogawa-Hewlett-Packard, Ltd.) for a signal oscillator and a spectrum analyzer, respectively.

MEASUREMENT OF HI-FI SOUND CARRIER SIGNAL OUTPUT

A 100% chrominance signal was recorded on the tape with the VTR, and a hi-fi sound carrier signal was recorded similarly as mentioned above, but without any acoustic signal. By definition, the output of the carrier signal was the 1.7-MHz component of the RF output of the hi-fi sound signal obtained by playback.

The relationship between the coercivity—Hc—of the magnetic layer and the carrier signal output (hi-fi output) is illustrated in FIG. 1.

FIG. 1 also illustrates the carrier signal output (1.7 MHz output) obtained when no chrominance signal was recorded.

As can be seen from the results illustrated in FIG. 1, the sensitivity of the carrier signal is high but the rate of erasion increases when the coercivity of the magnetic layer is high, whereas the rate of erasion decreases but the sensitivity of the carrier signal is low when the coercivity of the magnetic layer is low. In particular, it is found that higher carrier signal output is attainable at about 850–1200 Oe after the superimposed recording of the chrominance signal.

EXPERIMENTAL EXAMPLE 2

The effective recording depth of the chrominance signal in the S-VHS format was measured.

| Composition III | |
|---|---|
| Co-containing γ-Fe$_2$O$_3$ (having a BET value of 40 m$^2$/g and a coercivity of 650 Oe) | 100 parts |
| Vinyl chloride/vinyl acetate/vinyl alcohol 92:2:6) copolymer (having a degree of polymerization of 400) | 10 parts |
| Polyurethane type resin (having a number-average molecular weight of 50,000) | 6 parts |
| Polyisocyanate | 3 parts |
| α-Fe$_2$O$_3$ (having a mean particle size of about 0.15 μm) | 4 parts |
| Lubricant | 2 parts |
| Methyl ethyl ketone | 200 parts |
| Cyclohexanone | 100 parts |

A coating material, obtained from this composition in similar manners as stated above, was coated a polyester base film at varied thickness by means of a reverse roll. After drying and surface smoothing, the resultant coat was cured and the film was cut in similar manners as stated above, thereby obtaining tape samples including magnetic layers varying in thickness.

The thickness of the base film was selected from a range of 14 to 17 μm such that the total tape thickness of each sample was substantially kept constant. The magnetic layer had a coercivity of 700 Oe.

These samples were measured in similar manners as in Experimental Example 1.

Figure 2:
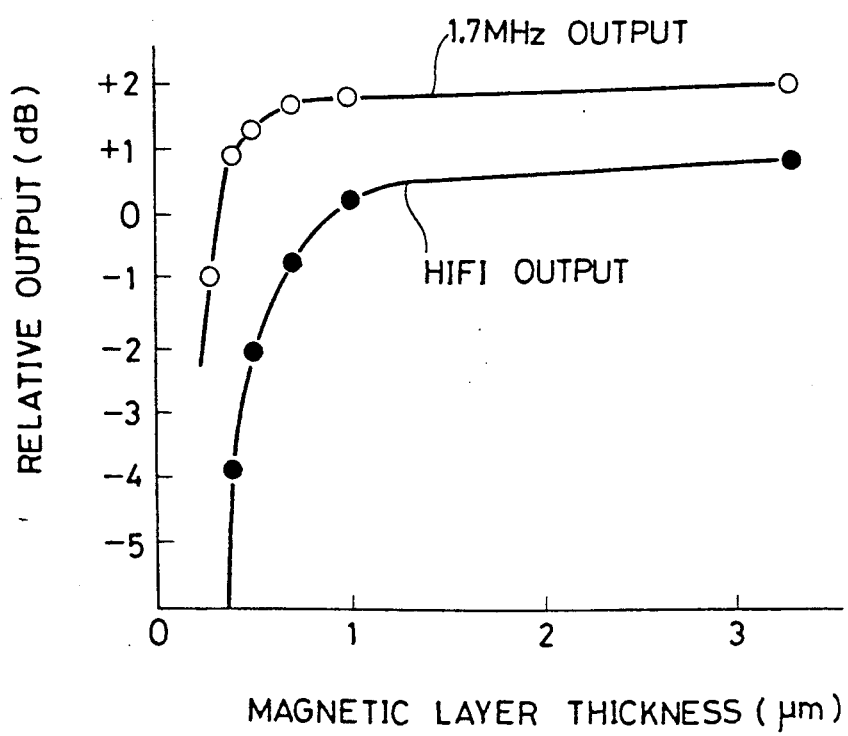
FIG. 2 is a graph showing the relation between the thickness of a magnetic layer and the playback output of a hi-fi sound carrier signal.

The relationships between the carrier signal playback output (hi-fi output) when the chrominance signal was inputted/the carrier signal playback output (1.7-MHz output) when no chrominance signal was inputted and the coercivity of the magnetic layer are illustrated in FIG. 2.

From FIG. 1, it is found that when the magnetic layer has a thickness of about 1.2 μm or below, the rate of erasion of the carrier signal by the chrominance signal is high. It is presumed that the chrominance signal has an effective recording depth lying within such a range.

EXAMPLE 1

Prepared was an S-VHS tape sample including the first and second magnetic layers.

With the following compositions, magnetic coating materials were prepared in similar manners as stated above.

Composition IV

The same as Composition III.

| Composition V | |
|---|---|
| Co-containing γ-Fe$_2$O$_3$ (having a BET value of 50 m$^2$/g and a coercivity of 850 Oe) | 100 parts |
| Vinyl chloride/vinyl acetate/vinyl alcohol 92:2:6) copolymer (having a degree of polymerization of 400) | 10 parts |
| Polyurethane type resin (having a number-average molecular weight of 40,000) | 6 parts |
| Polyisocyanate | 3 parts |
| α-Al$_2$O$_3$ (having a mean particle size of about 0.2 μm) | 8 parts |
| Lubricant | 2 parts |
| Methyl ethyl ketone | 200 parts |
| Cyclohexanone | 100 parts |

A coating material prepared from Composition IV was coated on a polyester base film by means of a reverse roll, followed by drying and smoothing. Afterwards, the film was placed in a constant temperature chamber of 60° C. for 24-hour curing, thereby obtaining the first magnetic layer. The magnetic coating material was found to have a percentage of residual solvents of 0.5% by weight and a degree of curing of 85% expressed in terms of gel fraction. As already stated, the gel fraction was found by measuring the weight ratio of the binder before and after immersing the magnetic layer in methyl ethyl ketone at 80° C. for 2 hours.

Then, a magnetic coating material prepared from Composition V was coated on the first magnetic layer by means of a reverse roll, followed by drying and surface smoothing.

Furthermore, the base film was coated on its back side with a coating material comprising the following Composition VI at a thickness of about 1.0 μm, followed by drying.

| Composition VI | |
|---|---|
| Carbon black (having a mean particle size of 0.02 μm) | 30 parts |
| α-Fe$_2$O$_3$ (having a mean particle size of about 0.15 μm) | 1 parts |
| Nitrocellulose | 20 parts |
| Polyurethane type resin (having a number-average molecular weight of 40,000) | 10 parts |
| Polyisocyanate | 5 parts |

-continued

| Composition VI | |
|---|---|
| Lubricant | 1 parts |
| Methyl ethyl ketone | 200 parts |
| Cyclohexanone | 100 parts |
| Toluene | 100 parts |

Then, curing was carried out in similar manners as stated above, thereby obtaining a second magnetic layer and a back coat.

Subsequently, the base film was cut to a width of 12.65 mm to obtain a tape sample.

Various samples were prepared while the 1st and 2nd magnetic layers varied in thickness.

Prepared for the purpose of comparison were Sample No. 1 having the first magnetic layer alone and Sample No. 10 having the second magnetic layer alone.

Set out below are the magnetic properties and Ra values of the 1st and 2nd magnetic layers in these samples.

TABLE 1

| | 1st Magnetic Layer | 2nd Magnetic Layer |
|---|---|---|
| Coercivity (Oe) | 700 | 950 |
| Remanence (G) | 1800 | 1650 |
| Squareness ratio | 0.88 | 0.89 |
| Ra (μm) | 0.0045 | 0.0048 |

It is understood that the base film had an Ra regulated to 0.0070 μm.

These samples were measured for the playback outputs (hi-fi outputs) of the hi-fi sound carrier signal after the superimposed recording of the chrominance signal in similar manners as in Experimental Example 1.

The playback output and S/N of the luminance signal were also measured.

The luminance signal playback output was determined in the following manners. A 50% white signal was recorded in the S-VHS mode using a TG-7 made by Shibasoku. Then, the carrier signal corresponding to the luminance signal was read out on the spectrum analyzer.

With a noise meter 925 D made by Shibasoku, the luminance signal S/N was determined by reproducing the signal recorded similarly as mentioned above.

The results are set out in the following Table 2.

These samples were also estimated for the durability of their magnetic layers by lapping testing.

The lapping testing was carried out by subjecting the magnetic layers' surfaces to repeated lapping with a lapping tape having an $Al_2O_3$-containing coating material provided on its base by coating. Following lapping, each magnetic layer was visually inspected for its damage. When it was little scraped out, the mark was "o", when slightly striped, "Δ", and when striped and damaged over an large area, "X".

TABLE 2

| Sample No. | Thickness (μm) | | HiFi Output (dB) | Luminance Signal | | Lapping Durability |
| | 2nd Magnetic Layer | 1st Magnetic Layer | | Output (dB) | S/N (dB) | |
|---|---|---|---|---|---|---|
| 1* | 0 | 3.3 | +2.4 | −0.8 | −0.4 | X |
| 2* | 0.2 | 3.1 | +3.1 | +1.9 | +1.6 | o |
| 3 | 0.3 | 3.0 | +5.1 | +2.0 | +1.7 | o |
| 4 | 0.4 | 2.9 | +5.3 | +2.1 | +1.7 | o |
| 5 | 0.6 | 2.7 | +5.2 | +2.1 | +1.8 | o |
| 6 | 0.8 | 2.5 | +5.0 | +2.0 | +1.8 | o |
| 7 | 1.0 | 2.3 | +4.8 | +2.0 | +1.7 | o |

TABLE 2-continued

| Sample No. | Thickness (μm) | | HiFi Output (dB) | Luminance Signal | | Lapping Durability |
| | 2nd Magnetic Layer | 1st Magnetic Layer | | Output (dB) | S/N (dB) | |
|---|---|---|---|---|---|---|
| 8 | 1.2 | 2.1 | +4.0 | +2.1 | +1.8 | o |
| 9* | 1.8 | 1.5 | +3.1 | +2.0 | +1.7 | Δ |
| 10* | 3.3 | 0 | +3.2 | +2.1 | +1.7 | X |

*Comparison

The results tabulated in Table 2 explains explicitly the effect of the present invention.

Sample Nos. 3-8, in which the second magnetic layer had a thickness lying within the range of the present invention, all give extremely high hi-fi sound carrier signal output with improvements in the luminance signal output and S/N.

By contrast, Sample No. 2, in which the second magnetic layer had a thickness larger than the effective recording depth of the chrominance signal, is much reduced in the hi-fi sound carrier signal output. Furthermore, Sample No. 1 having the first magnetic layer alone is reduced in not only the hi-fi sound carrier signal output but also in the characteristics of the luminance signal.

Sample No. 9 in which the second magnetic layer has a thickness larger than the effective recording depth of the chrominance signal and No. 10 having the second magnetic layer alone show good luminance signal characteristics, but are reduced in the hi-fi sound carrier signal output.

Furthermore, the samples of the present invention all give satisfactory results in the durability testing.

Next, a sample was prepared by providing the coating material for the second magnetic layer on the coating material for the first magnetic layer previously coated, not via any drying step. The 1st and 2nd magnetic layers of this sample had the same thickness as those of Sample No. 4 shown in Table 2.

This sample's luminance signal output was decreased to + 1.4 dB, and the durability by the lapping test was estimated "Δ".

EXAMPLE 2

Using the following Composition VII for the first magnetic layer and the following Composition VIII for the second magnetic layer, various magnetic tape samples were prepared with the coercivity and BET value of the Co-containing $\gamma$-$Fe_2O_3$ contained in them being varied.

The samples were prepared with a base film having an Ra of 0.0090 μm and under the same conditions as in Ex. 1, provided that no back coat was provided.

Set out in the following Table 3 are the coercivity and thickness of the 1st and 2nd layers of each sample as well as the BET values of the Co-containing $\gamma$-$Fe_2O_3$.

| Composition VII | |
|---|---|
| Co-containing $\gamma$-$Fe_2O_3$ | 100 parts |
| Vinyl chloride/vinyl acetate/vinyl alcohol (92:2:6) copolymer (having a degree of polymerization of 400) | 10 parts |
| Polyurethane type resin (having a number-average molecular weight of 40,000) | 6 parts |
| Polyisocyanate | 3 parts |
| $\alpha$-$Fe_2O_3$ (having a mean particle size of about 0.15 μm) | 4 parts |
| Lubricant | 2 parts |

-continued

| Composition VII | |
|---|---|
| Methyl ethyl ketone | 200 parts |
| Cyclohexanone | 100 parts |

| Composition VIII | |
|---|---|
| Co-containing $\gamma$-$Fe_2O_3$ | 100 parts |
| Vinyl chloride/vinyl acetate/vinyl alcohol (92:2:6) copolymer (having a degree of polymerization of 400) | 10 parts |
| Polyurethane type resin (having a number-average molecular weight of 40,000) | 6 parts |
| Polyisocyanate | 3 parts |
| $\alpha Al_2O_3$ (having a mean particle size of about 0.2 $\mu$m) | 8 parts |
| Lubricant | 2 parts |
| Methyl ethyl ketone | 200 parts |
| Cyclohexanone | 100 parts |

Each of the obtained samples was measured in similar manners as in Ex. 1. For the measurement of the luminance signal, however, a 50% white signal was recorded in the VHS mode.

The results are set out in Table 3.

TABLE 3

| Sample No. | Coercivity (Oe) | | BET ($m^2/g$) | | Thickness ($\mu$m) | | HiFi Output (dB) | Luminance Signal | |
|---|---|---|---|---|---|---|---|---|---|
| | 2nd Magnetic Layer | 1st Magnetic Layer | 2nd Magnetic Layer | 1st Magnetic Layer | 2nd Magnetic Layer | 1st Magnetic Layer | | Output (dB) | S/N (dB) |
| 11 | 800 | 650 | 40 | 30 | 0.6 | 2.7 | +4.0 | +4.8 | +3.5 |
| 12* | 800 | 800 | 40 | 30 | 0.6 | 2.7 | +2.8 | +4.8 | +3.4 |
| 13* | 650 | 650 | 40 | 30 | 0.6 | 2.7 | −0.5 | +0.1 | 0.0 |
| 14* | 800 | 800 | 40 | 40 | 0.6 | 2.7 | +2.5 | +4.7 | +3.5 |
| 15* | 800 | 650 | 40 | 30 | 1.5 | 1.8 | +2.6 | +4.8 | +3.4 |

*Comparison

The results summarized in Table 4 explain explicitly explain the invention of the present invention.

That is, the sample of the present invention in which the second magnetic layer is higher in coercivity than the first magnetic layer gives higher hi-fi output with improvements in the luminance signal output and S/N.

As detailed above, the present invention successfully provides a magnetic recording medium which is designed such that when a surface-band recording signal is recorded on a baseband recording signal in superimposed relation, successful results are obtained for the output and S/N of the surface-band recording signal and the output and S/N of the baseband recording signal are increasingly improved, and which has improved durability.

It will be appreciated by those of ordinary skill in the art that the present invention can be embodied in other forms without departing from the spirit or essential characteristics thereof.

We claim:

1. A magnetic recording medium in which a baseboard recording signal is recorded on a magnetic recording medium at a first effective recording depth and a surface-band recording signal is then recorded thereon in superimposed relation at a second effective recording depth being smaller than said first effective recording depth, wherein:
   a non-magnetic substrate includes thereon a first magnetic layer and a second magnetic layer on that order,
   said second magnetic layer having a thickness substantially equal to the effective recording depth of said surface-band recording signal, and
   said second magnetic layer having a coercivity higher than that of said first magnetic layer, said first magnetic layer having a coercivity of 500 to 750 Oe and the second magnetic layer having a coercivity of 650 to 1,200 Oe.

2. A magnetic recording medium as set forth in claim 1, wherein the total thickness of said first and second magnetic layers is larger than the effective recording depth of said baseband recording signal.

3. A magnetic recording medium as set forth in claim 1, wherein the surface-band recording signal is a video signal, and the baseband recording signal is a hi-fi sound signal, a PCM sound signal or a tracking servo signal.

4. A magnetic recording medium as set forth in claim 3, wherein the surface-band recording signal is a video signal in a VHS systems and the baseband recording signal is a hi-fi sound signal in the VHS systems.

5. A magnetic recording medium as set forth in claim 4, wherein the thickness of the second magnetic layer ranges from 0.3 to 1.2 $\mu$m and the total thickness of said first and second magnetic layers ranges from 2.5 to 4.0 $\mu$m.

6. A magnetic recording medium as set forth in claim 5, wherein the first magnetic layer comprises magnetic powders having a BET value 30 to 45 $m^2/g$ and the second magnetic layer comprises magnetic powders having a BET value 40 to 55 $m^2/g$.

7. A magnetic recording medium as set forth in claim 6, wherein the first magnetic layer has a coercivity of 500 to 820 Oe, the second magnetic layer has a coercivity of 800 to 1200 Oe and the video and hi-fi signals are recorded in a S-VHS format.

8. A magnetic recording medium as set forth in claim 6, wherein the first magnetic layer has a coercivity of 500 to 720 Oe, the second magnetic layer has a coercivity of 650 to 850 Oe and the video and hi-fi sound signals are recorded in a VHS format.

* * * * *